(12) United States Patent
Spitz et al.

(10) Patent No.: US 9,875,366 B2
(45) Date of Patent: Jan. 23, 2018

(54) MICROPROCESSOR SYSTEM WITH SECURED RUNTIME ENVIRONMENT

(71) Applicant: TRUSTONIC LIMITED, Cambridge (GB)

(72) Inventors: Stephen Spitz, Karlsfeld (DE); Markus Kohler, Munich (DE); Ullrich Martini, Munich (DE)

(73) Assignee: TRUSTONIC LIMITED, Cambridge (GB)

(*) Notice: Subject to any disclaimer, the term of this patent is extended or adjusted under 35 U.S.C. 154(b) by 0 days.

(21) Appl. No.: 14/346,811

(22) PCT Filed: Oct. 4, 2012

(86) PCT No.: PCT/EP2012/004159
§ 371 (c)(1),
(2) Date: Mar. 24, 2014

(87) PCT Pub. No.: WO2013/050154
PCT Pub. Date: Apr. 11, 2013

(65) Prior Publication Data
US 2014/0237621 A1    Aug. 21, 2014

(30) Foreign Application Priority Data

Oct. 7, 2011  (DE) .......................... 10 2011 115 135

(51) Int. Cl.
*G06F 7/04* (2006.01)
*G06F 21/62* (2013.01)
(Continued)

(52) U.S. Cl.
CPC .............. *G06F 21/62* (2013.01); *G06F 21/53* (2013.01); *G06F 9/54* (2013.01)

(58) Field of Classification Search
None
See application file for complete search history.

(56) References Cited

U.S. PATENT DOCUMENTS 5,001,742 A    3/1991    Wang
7,809,875 B2   10/2010   Sundaram et al.
(Continued)

FOREIGN PATENT DOCUMENTS

CN    1813244      8/2006
CN    101078922    11/2007
(Continued)

OTHER PUBLICATIONS

Sepia, Secure Embedded Platform with Advanced Process Isolation and Anonymity capabilities, May 2011, Revision 0.5, pp. 1-36.*
(Continued)

*Primary Examiner* — Esther B Henderson
(74) *Attorney, Agent, or Firm* — Nixon & Vanderhye P.C.

(57) ABSTRACT

Microprocessor system that is implemented or can be implemented in a mobile terminal and comprises: a normal operating system designed to generate and maintain a non-secure runtime environment and a security operating system designed to generate and maintain a secured runtime environment, and an operating system interface between the normal operating system and the security operating system, said operating interface being designed to control communication between the non-secure runtime environment and the secured runtime environment on the operating system level, and at least one filter interface that is designed to securely control communication between the non-secure runtime environment and a secured runtime environment on a level different from the operating system level.

9 Claims, 3 Drawing Sheets

(51) Int. Cl.
*G06F 21/53* (2013.01)
*G06F 9/54* (2006.01)

(56) References Cited

U.S. PATENT DOCUMENTS

| | | | |
|---|---|---|---|
| 8,108,641 B2* | 1/2012 | Goss | G06F 12/1408 711/163 |
| 8,122,361 B2 | 2/2012 | Avraham et al. | |
| 8,194,088 B1 | 6/2012 | Paquette | |
| 8,528,041 B1* | 9/2013 | Haney | H04L 63/101 713/151 |
| 8,793,803 B2 | 7/2014 | Henry et al. | |
| 2001/0000265 A1 | 4/2001 | Schreiber | |
| 2003/0004827 A1 | 1/2003 | Wang | |
| 2004/0153672 A1 | 8/2004 | Watt et al. | |
| 2004/0177269 A1 | 9/2004 | Belnet et al. | |
| 2005/0033972 A1 | 2/2005 | Watson | |
| 2005/0097341 A1 | 5/2005 | Francis et al. | |
| 2005/0101295 A1 | 5/2005 | Rupp | |
| 2006/0242517 A1 | 10/2006 | Pedley et al. | |
| 2007/0079111 A1 | 4/2007 | Chen | |
| 2007/0199046 A1 | 8/2007 | O'Brien | |
| 2007/0226795 A1* | 9/2007 | Conti | G06F 21/74 726/22 |
| 2008/0005790 A1* | 1/2008 | Jirka | H04L 63/10 726/11 |
| 2008/0005794 A1 | 1/2008 | Inoue et al. | |
| 2008/0092145 A1 | 4/2008 | Sun | |
| 2008/0155258 A1 | 6/2008 | Obereiner | |
| 2008/0204787 A1 | 8/2008 | Miyajima | |
| 2008/0209212 A1 | 8/2008 | Ditzman et al. | |
| 2008/0222309 A1* | 9/2008 | Shanbhogue | G06F 21/53 709/250 |
| 2008/0316357 A1 | 12/2008 | Achari et al. | |
| 2009/0210879 A1 | 8/2009 | Kaiser et al. | |
| 2009/0254986 A1 | 10/2009 | Harris et al. | |
| 2009/0307783 A1 | 12/2009 | Maeda et al. | |
| 2009/0320048 A1 | 12/2009 | Watt et al. | |
| 2009/0327552 A1 | 12/2009 | Sundaram et al. | |
| 2010/0031325 A1* | 2/2010 | Maigne | G06F 9/45533 726/4 |
| 2010/0125904 A1 | 5/2010 | Nice et al. | |
| 2010/0132015 A1 | 5/2010 | Lee et al. | |
| 2011/0003580 A1 | 1/2011 | Belrose et al. | |
| 2011/0065419 A1 | 3/2011 | Book et al. | |
| 2011/0099609 A1 | 4/2011 | Malhotra et al. | |
| 2011/0107426 A1 | 5/2011 | Yen et al. | |
| 2012/0154265 A1 | 6/2012 | Kim | |
| 2012/0299831 A1 | 11/2012 | Lioy | |
| 2013/0046697 A1 | 2/2013 | Schibuk | |
| 2014/0007120 A1 | 1/2014 | Spitz | |
| 2014/0007251 A1 | 1/2014 | Spitz | |
| 2014/0041050 A1 | 2/2014 | Heider | |
| 2014/0316993 A1 | 10/2014 | Spitz | |

FOREIGN PATENT DOCUMENTS

| | | |
|---|---|---|
| CN | 101211277 | 7/2008 |
| CN | 101299228 | 11/2008 |
| DE | 10 2007 05282 | 5/2009 |
| JP | H01-185734 | 7/1989 |
| JP | H05-265779 | 10/1993 |
| JP | 2003-091612 | 3/2003 |
| JP | 2004-199693 | 7/2004 |
| JP | 2004-288155 | 10/2004 |
| JP | 2005-108223 | 4/2005 |
| JP | 2006-018745 | 1/2006 |
| JP | 2006-506751 | 2/2006 |
| JP | 2006-179011 | 7/2006 |
| JP | 2006-309760 | 11/2006 |
| JP | 2007-188216 | 7/2007 |
| JP | 2010-033483 | 2/2010 |
| JP | 2010-62823 | 3/2010 |
| JP | 2010-129054 | 6/2010 |
| JP | 2010-532107 | 9/2010 |
| WO | 00/43876 | 7/2000 |
| WO | 01/17296 | 3/2001 |
| WO | 01/75595 | 10/2001 |
| WO | 2005/001666 | 1/2005 |
| WO | 2006/022161 | 3/2006 |
| WO | 2006/029596 | 3/2006 |
| WO | 2007/109145 | 9/2007 |
| WO | 2008/049186 | 5/2008 |
| WO | 2008/106400 | 9/2008 |
| WO | 2009/059935 | 5/2009 |
| WO | 2009/071734 | 6/2009 |

OTHER PUBLICATIONS

Secunet, Towards a Secure Automotive Platform, Aug. 2009, White Paper, pp. 1-16.*
International Preliminary Report on Patentability and English translation dated Apr. 17, 2014 in PCT/EP2012/004159.
Wei Huang et al., "Virtual machine aware communication libraries for high performance computing", *Proceedings of the 2007 ACM/IEEE Conference on Supercomputing*, Nov. 10, 2007, pp. 1-12.
[Online] ARM Limited, "ARM Security Technology—Building a Secure System using TrustZone Technology", *Internet Citation*, Apr. 30, 2009, p. I-XII.
[Online] Giesecke & Devrient, "Mobicore: Giesecke & Devrient's Secure OS for Arm TrustZone Technology (White Paper)", Internet Citation, Jan. 1, 2010, pp. 1-8.
International Search Report for PCT/EP2012/004159, dated Jan. 4, 2013.
German Search Report dated Jun. 11, 2012 in DE 10 2011 115 135.8, 5 pages.
ARM "Securing the System with TrustZone® Ready Program" 2010, pp. 1-22.
S. Suh, "Secure Xen on ARM: Status and Driver Domain Separation" Samsung Electronics, Aug. 2007, pp. 1-21.
U.S. Appl. No. 14/001,332, filed Sep. 17, 2013, Inventor: Spitz.
U.S. Appl. No. 14/001,361, filed Sep. 17, 2013, Inventor: Spitz.
U.S. Appl. No. 14/113,066, filed Oct. 21, 2013, Inventor: Heider.
U.S. Appl. No. 14/352,376, filed Apr. 17, 2014, Inventor: Spitz.
Final Office Action dated Jul. 28, 2015 in co-pending U.S. Appl. No. 14/001,332, 14 pages.
Office Action dated Mar. 19, 2015 in co-pending U.S. Appl. No. 14/001,332, 14 pages.
Office Action dated Feb. 12, 2016 in co-pending U.S. Appl. No. 14/001,361, 23 pages.
Final Office Action dated Aug. 17, 2015 in co-pending U.S. Appl. No. 14/113,066 15 pages.
Office Action dated Jan. 22, 2015 in co-pending U.S. Appl. No. 14/113,066 18 pages.
Chinese Office Action dated May 19, 2015 in CN 201280010321.9 and English translation, 30 pages.
Chinese Office Action dated Aug. 6, 2014 in CN 201280018611.8 and English translation, 17 pages.
English translation of Chinese Second Office Action dated Feb. 10, 2015 in CN 201280018611.8, 9 pages.
Chinese Third Office Action dated Aug. 4, 2015 in CN 201280018611.8 and English translation, 8 pages.
English translation of Japanese Office Action dated Feb. 3, 2015 in JP 2013-554811, 5 pages.
Japanese Office Action issued Jun. 2, 2015 in JP 2014-505539 and English translation, 6 pages.
Computer-generated abridged translation of JP-A-2010-033483, 8 pages.
Computer-generated abridged translation of JP-A-2003-091612, 4 pages.
German Search Report dated Nov. 7, 2011 in DE 10 2011 012 227.3, 2 pages.
German Search Report dated Dec. 14, 2011 in DE 10 2011 018 431.7, 5 pages.
International Preliminary Report on Patentability dated Sep. 6, 2013 in PCT/EP2012/000763 and English translation, 14 pages.

(56) References Cited

OTHER PUBLICATIONS

International Search Report for PCT/EP2012/000763, dated Nov. 22, 2012, 3 pages.
Translation of the International Preliminary Report on Patentability dated May 1, 2014 in PCT/EP2012/004033, 8 pages.
International Search Report for PCT/EP2012/004033 dated Dec. 12, 2012, 5 pages.
International Search Report for PCT/EP2012/000765, dated Nov. 5, 2012, 8 pages.
International Preliminary Report on Patentability dated Sep. 6, 2013 in PCT/EP2012/000765 and English translation, 14 pages.
International Search Report for PCT/EP2012/001700, dated Sep. 12, 2012, 2 pages.
Foreign-language Written Opinion of the International Searching Authority for PCT/EP2012/001700, dated Sep. 12, 2012, 6 pages.
D. Li et al, "A High-efficient Inter-Domain Data Transferring System for Virtual Machines" Proceedings of the 3$^{rd}$ International Conference on Ubiquitous Information Management and Communication, Jan. 2009, pp. 385-390.
X. Zhang et al, "XenSocket: A High-Throughput Interdomain Transport for Virtual Machines" Proceedings of the ACM/IFIP/USENIX 2007 International Conference on Middleware, Nov. 2007, pp. 184-203.
Dietrich et al., "Towards Customizable, Application Specific Mobile Trusted Modules", *Proceedings of the Fifth ACM Workshop on Scalabe Trusting Computing, STC '10*, Jan. 1, 2010, 10 pages.
ARM, "The architecture of the digital world" Dec. 2, 2010, pp. 1-9.
ARM, White Paper "Designing with TrustZone—Hardware Requirements", (Aug. 10, 2005), pp. 1-10.
Xu et al., "Design and Implementation of Secure Embedded Systems Based on Trustzone", The 2008 International Conference on Embedded Software and Systems (ICESS2008) (Jul. 29, 2008), pp. 136-141.
Japanese Office Action dated Oct. 30, 2015 issued in JP 2014-533790 and English translation, 10 pages.
Chinese Office Action dated Dec. 7, 2015 issued in CN 201280049509.4 and English translation, 17 pages.
Office Action dated Mar. 18, 2016 in co-pending U.S. Appl. No. 14/113,066 12 pages.
English translation of Chinese Third Office Action dated Sep. 13, 2016 in CN 201280049509.4, 4 pages.
English translation of Japanese Office Action dated Feb. 17, 2017 in JP 2014-536127, 2 pages.
Second Chinese Office Action dated Jun. 2, 2016 in CN 201280049509.4 and English translation, 12 pages.
Japanese Office Action dated Jun. 29, 2016 in JP 2014-533790 and English translation, 6 pages.
Final Office Action dated Apr. 5, 2017 in co-pending U.S. Appl. No. 14/352,376 24 pages.
Office Action dated Sep. 20, 2017 in co-pending U.S. Appl. No. 14/352,376 26 pages.

* cited by examiner

MICROPROCESSOR SYSTEM WITH SECURED RUNTIME ENVIRONMENT

This application is the U.S. national phase of International Application No. PCT/EP2012/004159 filed 4 Oct. 2012 which designated the U.S. and claims priority to DE Patent Application No. 10 2011 115 135.8 filed 7 Oct. 2011, the entire contents of each of which are hereby incorporated by reference.

The invention relates to a microprocessor system implementable or implemented in a mobile terminal with a secure runtime environment.

A microprocessor system comprises a microprocessor and one or more volatile and nonvolatile memories, from a functional standpoint in particular at least one operating system memory, in which an operating system is stored, one or more application memories, in which applications that are executable by the microprocessor under the control of the operating system are stored, and a main memory, in which data to be processed by the microprocessor can be stored. The operating system generates and maintains during its operation a runtime environment in which the applications are executable on the microprocessor system. The microprocessor system is generally implemented on one chip, e.g. semiconductor chip, possibly also on a plurality of connected chips.

A mobile terminal is understood to mean a cellular phone, smartphone, PDA (personal digital assistant) or similar terminal.

The designation ARM Trustzone architecture denotes a known bipartite runtime architecture from the company ARM for a microprocessor system, this architecture comprising two runtime environments. A first, insecure runtime environment, called "Normal Zone" or "Normal World", is controlled by a normal operating system. A second, secure or trustworthy runtime environment, called "Trustzone" or "Trusted World" or "Secure World" is controlled by a security operating system.

The normal operating system can be, for example, a conventional operating system such as Android, Windows Phone, Symbian or the like.

The applicant of the present patent application manufactures and sells a security operating system for chips that are to be implemented in mobile terminals, under the trade designation MOBICORE. In particular security-critical applications and some peripheral functions (e.g. keyboard driver) are controlled securely by the security operating system MOBICORE. Applications under the security operating system are also designated as trustlets, by analogy with the terms "Trust" and "Applet". Further applications and other peripheral functions (e.g. display driver, NFC interface driver, radio interface layer RIL) are controlled by the normal operating system (also called Rich OS or HLOS). The security operating system comprises a cryptographic key, the authentication key Kauth, by means of which the security operating system can identify itself with respect to a background system. Optionally, the authentication key Kauth is additionally provided for operating a secure communication channel between the chip or mobile terminal and the background system. The background system is, for example, a background system known per se of a mobile radio network.

Accesses on the part of the normal operating system from the insecure runtime environment to the secure runtime environment, e.g. for calling an application in the secure runtime environment (trustlet), or for exchanging data, are carried out as standard exclusively by means of a security driver, e.g. Mobicore driver, which is implemented within the insecure runtime environment, but is controlled by the security operating system and functions at the operating system level. The security driver can e.g. transfer tasks of the normal operating system to the security operating system and forward results with respect to tasks, said results being provided by the security operating system, to the normal operating system. The security driver mediates a secure communication channel between the normal operating system and the security operating system, said channel being completely sufficient for exchanging relatively small volumes of data.

An application (Trustlet) or peripheral function implemented in the secure runtime environment can be accessed only by the security operating system. By contrast, the Trustlet cannot be directly accessed from the normal operating system.

Virtually all peripheral structures of the mobile terminal (with the exception of e.g. the keyboard), that is to say structures of the mobile terminal that go beyond the central microprocessor, are implemented under the normal operating system and are thus insecure to the greatest extent since the respective peripheral drivers are implemented in the insecure runtime environment "Normal Zone".

Some processes of communication of the peripheral structures with the operating system or via the operating system are security-critical, e.g. those in which secret data such as e.g. the secret number PIN are processed, or in which security-relevant commands are processed, e.g. a command for confirming or initiating a payment transaction. For such security-critical communication processes, a secure link of the peripheral structures would be desirable in order to prevent covert observation of data or manipulation of commands.

The most direct possibility for making the operation of the peripheral structures more secure is to implement the respective peripheral drivers under the security operating system instead of under the normal operating system. (The relatively small and compact keyboard driver in a mobile terminal with MobiCore as security operating system is, for example, often already implemented under the security operating system as standard.) This has the consequence, however, that all accesses to the peripheral structure must necessarily be effected by the security operating system. Since, under the security operating system, complex security measures such as authentications and encryptions are required for all accesses, moving the drivers from the normal operating system to the security operating system slows down the operation of the mobile terminal quite considerably. However, a considerable proportion of accesses to a peripheral structure is not security-critical and could proceed just as well under the insecure but faster normal operating system.

Applications for a wide variety of purposes of use, for example payment transactions (banking, payment) or ticket sales for means of transport (ticketing) or bonus point and discount systems (loyalty) are widely implemented at least in part under the control of the security operating system, in a manner executable in the secure execution environment. In this case, at least parts of the application are implemented additionally or only under the control of the normal operating system, in a manner executable in the insecure execution environment, in particular parts of the application which are directed to an interaction with a user or a user interface of the mobile terminal. If communication is required between parts of the application in the secure and insecure runtime environments, this takes place at the operating system level by means of the security driver, which makes the communication slow.

The invention is based on the object of providing a microprocessor system implementable or implemented in a mobile terminal with a secure runtime environment, which microprocessor system enables secure and at the same time efficient communication between the insecure runtime environment and the secure runtime environment.

The object is achieved by means of a microprocessor system as claimed in claim 1. Advantageous embodiments of the invention are specified in the dependent claims.

The microprocessor system according to the invention as claimed in independent claim 1 is implementable or implemented in a mobile terminal and comprises:
- a normal operating system, which is designed for generating and maintaining an insecure runtime environment,
- a security operating system, which is designed for generating and maintaining a secure runtime environment, and
- an operating system interface between the normal operating system and the security operating system, said operating system interface being designed to securely control communication between the insecure runtime environment and the secure runtime environment at the operating system level.

The microprocessor system is characterized by at least one filter interface, which is designed to securely control communication between the insecure runtime environment and the secure runtime environment at a level different from the operating system level.

The filter interface enables accelerated and at the same time secure communication since it provides, beside the communication channel at the operating system level, a further secure communication channel, which can be used for more direct communication than communication via the detour of the operating system.

Therefore, claim 1 provides a microprocessor system which enables secure and at the same time efficient communication between the insecure runtime environment and the secure runtime environment.

The filter interface has a first, insecure partial filter interface, which is designed to run in the insecure runtime environment, and a second, secure partial filter interface, which is designed to run in the secure runtime environment. As a result, the filter interface can mediate between the secure and insecure runtime environments.

In accordance with one alternative, the filter interface provided is a hardware filter interface, which is designed to securely control communication between the insecure runtime environment and the secure runtime environment at the hardware level. The secure communication between the secure and insecure runtime environments can thus take place immediately and directly at the hardware level and therefore in an accelerated manner.

The control at the hardware level is optionally effected as control by direct driving of hardware components such as e.g. peripheral structures such as display, SIM card, etc. (cf. below), or optionally as control via a bus system, for example via an I2C bus.

In accordance with the alternative according to which the filter interface provided is a hardware filter interface, the microprocessor system optionally further comprises:
- at least one driver for a peripheral structure of the mobile terminal, said at least one driver being drivable by the normal operating system and being executable in the insecure runtime environment, and a—preferably reduced—driver for the peripheral structure, said driver being drivable by the security operating system and being executable in the secure runtime environment and preferably having only a subset of the functionalities of the driver that is executable in the insecure runtime environment. In this case, the hardware filter interface is designed to securely control communication between the driver for a peripheral structure that is executable in the insecure runtime environment and the preferably reduced driver for the peripheral structure that is executable in the secure runtime environment, at the hardware level.

The hardware filter interface therefore enables direct communication between driver parts implemented under the normal operating system and driver parts implemented under the security operating system via the hardware filter interface.

As the peripheral structure of the terminal, for example, provision is made of: an NFC interface, a radio interface layer RIL involved in setting up connections into the mobile radio network, a security element SE used for authentication and encryption (e.g. SIM card or USIM card or Secure MicroSD card or permanently implemented Embedded Secure Element), a display, in particular touch-screen display, a PIN checking routine, which can be used to verify the secret number PIN (personal identification number) input via the keyboard, dial-in routines for dialing into networks different from the mobile radio network, such as, for example, the Internet (IP) or virtual private networks (VPN), buffer memory (e.g. frame buffer).

Optionally, if drivers are implemented for a plurality of peripheral structures in the microprocessor system, a common hardware interface is provided for all the peripheral structures, said hardware interface enabling accesses between the insecure and secure runtime environments at the hardware level exclusively between the drivers associated with the same peripheral structure, and preventing accesses between drivers associated with different peripheral structures at the hardware level. By virtue of the fact that the direct hardware level accesses are reserved only for the mutually corresponding drivers with respect to the same peripheral structure, an improper access to the driver by malware, for example a Trojan or the like, is averted.

Accesses between drivers associated with different peripheral structures could take place at most by means of the security driver at the operating system level, provided that these excesses are permissible in accordance with a check by the security driver. The security driver would identify and ward off malware, for example.

Optionally, the hardware filter interface is deigned to check (e.g. in the insecure runtime environment) accesses directed to the driver for a peripheral structure with regard to relevance to security and, in the case where the access is identified as relevant to security, to convey the access to the reduced driver in the secure runtime environment and, in the case where the access is identified as not relevant to security, to convey the access to the driver in the insecure runtime environment.

Optionally, the driver for a peripheral structure that is executable in the secure runtime environment is reduced to the effect that it only comprises functionalities which are required for processing security-relevant accesses. By contrast, the driver for a peripheral structure that is executable in the insecure runtime environment preferably comprises all the functionalities of the driver.

In accordance with a further alternative, the filter interface provided is an application filter interface, which is designed to securely control communication between the insecure runtime environment and the secure runtime environment at the application level. The application filter interface provides a direct secure communication channel at the application level, which communication channel enables faster communication than via the detour via the operating system level and the security driver operating at the operating system level.

The microprocessor system further optionally comprises at least one application which is at least partly drivable by the normal operating system and executable in the insecure runtime environment, and is at least partly drivable by the security operating system and executable in the secure runtime environment. In this case, the application filter interface is designed to securely control communication between the at least partial application that is executable in the insecure runtime environment and the at least partial application that is executable in the secure runtime environment, at the application level.

The application can be, for example, a banking or payment application for payment transactions, or a ticketing application for purchasing and administration of tickets for a wide variety of purposes, e.g. means of transport. At least security-relevant functionalities of the application are optionally implemented under the security operating system. Supplementary, non-security-relevant functionalities are optionally implemented additionally or exclusively under the normal operating system.

In contrast to drivers where the drive in most cases will predominantly be implemented under the normal operating system, in the case of applications such as banking applications, for example, the overwhelming majority will usually be implemented under the security operating system.

Optionally, if a plurality of applications are implemented in the microprocessor system, a common application filter interface is provided for all the applications, said application filter interface enabling accesses between the insecure and secure runtime environments at the application level exclusively between the parts associated with the same application in the insecure and respectively the secure runtime environment, and preventing accesses between parts associated with different applications at the application level. By virtue of the fact that the direct application level accesses are reserved only for the mutually corresponding parts of the same application, an improper access to the application by malware, for example a Trojan or the like, is averted.

Application accesses between different applications across the boundary between the secure and insecure runtime environments can take place only at most at the operating system level by means of the security driver.

Optionally, the application filter interface is designed to check (e.g. in the insecure runtime environment) accesses directed to the application with regard to relevance to security and, in the case where the access is identified as relevant to security, to convey the access to the at least partial application in the secure runtime environment and, in the case where the access is identified as not relevant to security, to convey the access to the at least partial application in the insecure runtime environment.

The application filter interface can be provided as an alternative or in addition to the hardware filter interface. Optionally, the application filter interface and the hardware filter interface are both provided and designed for interaction.

In accordance with one development of the invention, the filter interface is coupled to a user output device, for example a loudspeaker, vibrating alert or the like of a mobile terminal (e.g. cellular phone), in such a way that on the occasion of any access effected via the filter interface from the insecure runtime environment to the secure runtime environment or/and from the secure runtime environment to the insecure runtime environment, that is to say across the boundary between secure and insecure runtime environments, a user message perceptible to a user of the microprocessor is output by the user output device. As a result, the user is made aware of any access taking place across the boundary between secure and insecure runtime environments and can e.g. recognize if security-critical data arrive and are forwarded from the filter interface to the secure runtime environment or/and if data are output from the secure runtime environment to the insecure runtime environment. The user output can be configured for example as a melody that is output by the mobile terminal.

Optionally, for accesses across the boundary between secure and insecure runtime environments from the insecure runtime environment to the secure runtime environment, on the one hand, and from the secure runtime environment to the insecure runtime environment, on the other hand, different user outputs, distinguishable to the user, are output. By way of example, different melodies are output depending on the access direction, from the insecure runtime environment to the secure runtime environment or from the secure runtime environment to the insecure runtime environment.

In accordance with one variant, the user message is always operated during the operation of the microprocessor within the secure runtime environment. In this variant, therefore, the user message output on the occasion of an access from the insecure runtime environment to the secure runtime environment is output temporally immediately after the access, in order to notify the user that operation is now actually taking place in the secure runtime environment. On the occasion of an access from the secure runtime environment to the insecure runtime environment, in this variant the user message is output temporally immediately before the access in order to warn the user that the secure runtime environment will be left forthwith. Alternatively or additionally, a user message can be output after the secure runtime environment has actually been left by the program execution. Likewise, alternatively or additionally, a user message can be output before the secure runtime environment is entered by the program execution.

The invention is explained in greater detail below on the basis of exemplary embodiments and with reference to the drawing, in which in schematic illustration:

Figure 1:
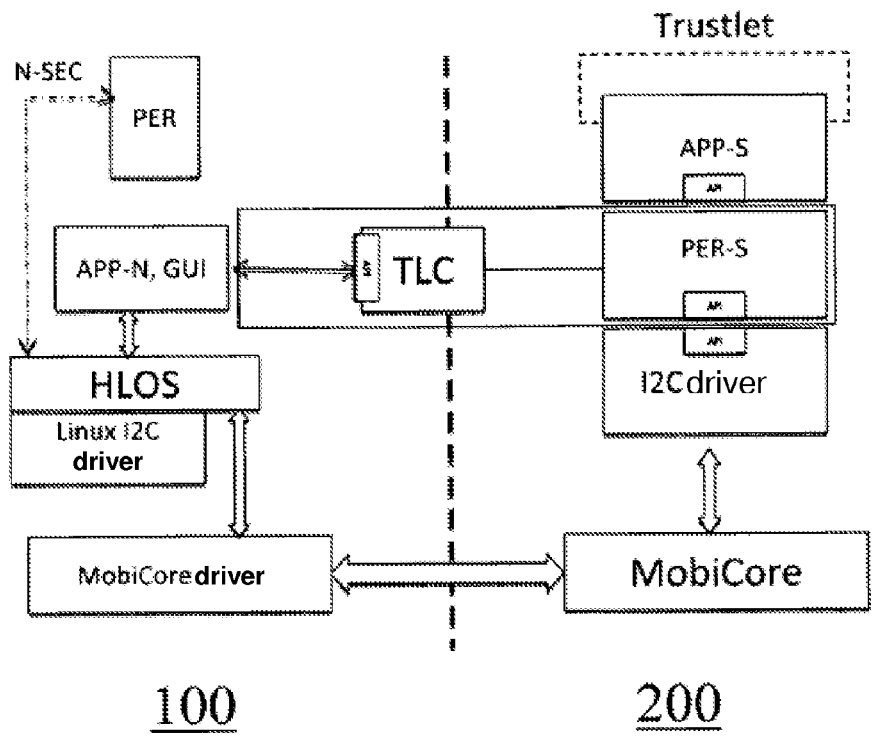
FIG. 1 shows a microprocessor system comprising an application filter interface, in accordance with one embodiment of the invention.

FIG. 1 shows a microprocessor system having an ARM architecture, having an insecure runtime environment 100 and a secure runtime environment 200, and having an application filter interface TLC (Trustlet Connector) implemented in each case partly in the insecure runtime environment 100 and in the secure runtime environment 200, in accordance with one embodiment of the invention. The insecure runtime environment 100 is controlled by a normal operating system HLOS. The secure runtime environment 200 is controlled by a security operating system MobiCore. Accesses between the insecure runtime environment 100 and the secure runtime environment 200 at the operating system level are carried out by means of a security driver MobiCore driver. The majority APP-S of an application APP, for example of a payment transaction application, is implemented under the security operating system MobiCore, in a manner executable in the secure runtime environment 200. The remainder APP-N of the application APP, for example payment transaction application, is implemented under the normal operating system HLOS, in a manner executable in the insecure runtime environment 100. The application filter interface TLC (Trustlet Connector) according to the invention enables a direct access between the part APP-S of the application APP that is implemented under the security operating system MobiCore, in a manner executable in the secure runtime environment 200, and the part APP-N of the application APP that is implemented under the normal operating system HLOS, in a manner executable in the insecure runtime environment 100, directly at the application level. A driver for a peripheral structure PER, for example a touch-screen display, is implemented in a conventional manner under the normal operating system HLOS in accordance with FIG. 1 and can communicate with the secure runtime environment 200 at most via the security driver MobiCore driver. A novel reduced driver PER-S implemented under the security operating system MobiCore can be reached from the insecure runtime environment 100 at most via the security driver MobiCore driver. In the insecure runtime environment 100, the peripheral driver PER communicates with the normal operating system HLOS via an I2C bus system, in a manner controlled by the Linux I2C driver. In the secure runtime environment 200, the reduced peripheral driver PER-S communicates with the security operating system MobiCore via an I2C bus system implemented in the secure runtime environment 200, in a manner controlled by the I2C driver therein. Communication between the peripheral drivers PER and PER-S can take place at most at the operating system level by means of the MobiCore driver.

Figure 2:
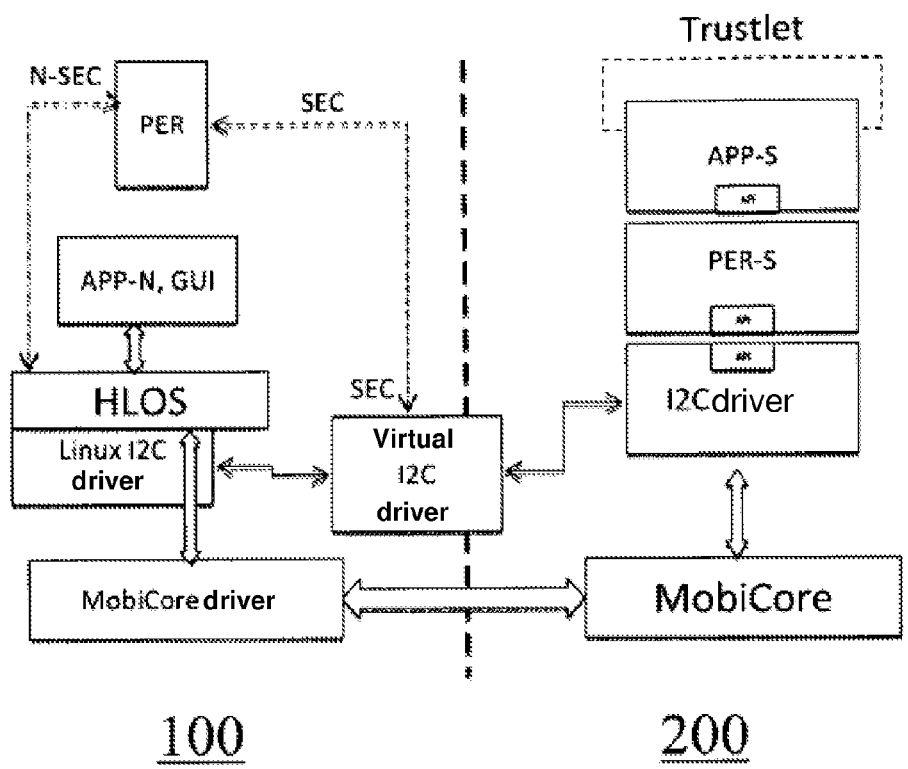
FIG. 2 shows a microprocessor system comprising a hardware filter interface, in accordance with one embodiment of the invention.

FIG. 2 shows a microprocessor system comprising a hardware filter interface, namely the virtual I2C driver, in accordance with one embodiment of the invention. Parts having the same designation as in FIG. 1 correspond to the parts from FIG. 1, unless described otherwise here. A driver for a peripheral structure PER, for example a touch-screen display, is implemented under the normal operating system HLOS. A novel reduced peripheral driver PER-S for the peripheral structure is implemented under the security operating system MobiCore. The virtual I2C driver (exemplary hardware filter interface) implemented in each case partly in the insecure runtime environment 100 and in the secure runtime environment 200 enables secure communication between the peripheral driver PER implemented under the normal operating system HLOS and the reduced peripheral driver PER-S MobiCore implemented under the security operating system, at the hardware level, more precisely at the level of the I2C bus. In the insecure runtime environment 100, the peripheral driver PER communicates with the normal operating system HLOS via the Linux I2C driver. In the secure runtime environment 200, the reduced peripheral driver PER-S communicates via the I2C driver therein with the security operating system MobiCore. The hardware filter interface, namely the virtual I2C driver, provides a secure communication channel between the Linux I2C driver of the bus system under HLOS and the I2C driver of the bus system under MobiCore, at a hardware level which is closer to the level of the peripheral driver than the operating system level. In the exemplary embodiment from FIG. 2, the parts APP-N, APP-S of the application APP can communicate with one another only at most at the operating system level, mainly by means of the MobiCore driver.

Figure 3:
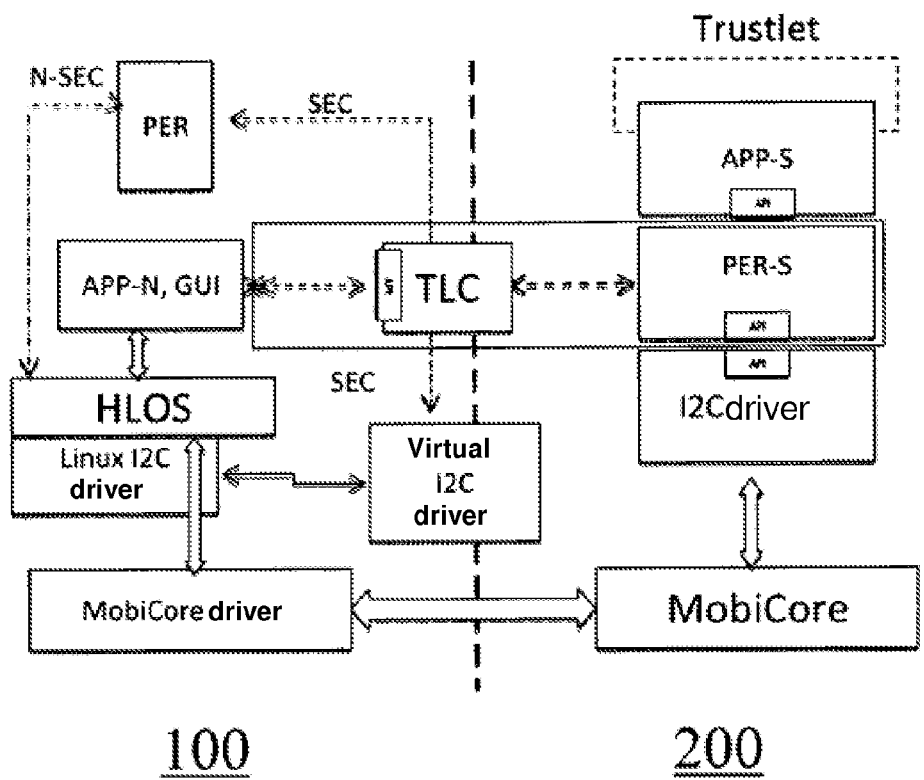
FIG. 3 shows a microprocessor system comprising an application filter interface and a hardware filter interface, in accordance with one embodiment of the invention.

FIG. 3 shows a microprocessor system comprising an application filter interface TLC and a hardware filter interface, virtual I2C driver, in accordance with one embodiment of the invention. FIG. 3 thus firstly illustrates a combination of the embodiments from FIG. 1 and FIG. 2. Furthermore, the application filter interface TLC and the hardware filter interface, virtual I2C driver, cooperate. On the part of the insecure runtime environment 100, the hardware filter interface (virtual I2C driver) communicates with the peripheral driver PER via the bus system Linux I2C driver. Toward the secure runtime environment 200, the hardware filter interface (virtual I2C driver) communicates with the application filter interface TLC and thus changes from the hardware level to the application level. Finally, the application filter interface TLC communicates into the secure runtime environment 200 at the application level with the reduced peripheral driver PER-S.

The invention claimed is:

1. A microprocessor system, implementable or implemented in a mobile terminal and comprising:
    a normal operation system configured to generate and maintain an insecure runtime environment,
    a security operating system configured to generate and maintain a secure runtime environment,
    an operating system interface between the normal operating system and the security operating system, the operating system interface configured to securely control communication between the insecure runtime environment and the secure runtime environment at the operating system level,
    a filter interface configured to securely control communication between the insecure runtime environment and the secure runtime environment at a level different from the operating system level,
    a normal driver for a peripheral structure of the mobile terminal, the normal driver being drivable by the normal operating system and being executable in the insecure runtime environment, and
    a reduced driver for the peripheral structure, the reduced driver being drivable by the security operating system, executable in the secure runtime environment, and having only a subset of the functionalities of the normal driver that is executable in the insecure runtime environment,
    wherein the filter interface is an application filter interface configured to securely control communication between the insecure runtime environment and the secure runtime environment within said microprocessor system at the application level.

2. The microprocessor system as claimed in claim 1, wherein the filter interface is a hardware filter interface configured to securely control communication between the insecure runtime environment and the secure runtime environment at the hardware level.

3. The microprocessor system as claimed in claim 2, wherein the secure control communication at the hardware level is effected via a bus system.

4. The microprocessor system as claimed in claim 2,
    wherein the hardware filter interface is configured to securely control communication at the hardware level between the normal driver for a peripheral structure that is executable in the insecure runtime environment and the reduced driver for the peripheral structure that is executable in the secure runtime environment.

5. The microprocessor system as claimed in claim 4, wherein the hardware filter interface is configured to check accesses directed to the driver for a peripheral structure with regard to relevance to security and, in the case where the access is identified as relevant to security, to convey the access to the reduced driver in the secure runtime environment and, in the case where the access is identified as not relevant to security, to convey the access to the normal driver in the insecure runtime environment.

6. The microprocessor system as claimed in claim 1, further comprising:
  at least one application,
    wherein the application is at least partly drivable by the normal operating system and executable in the insecure runtime environment, at least partly drivable by the security operating system, and executable in the secure runtime environment,
    wherein the application filter interface is configured to securely control communication between the at least partial application that is executable in the insecure runtime environment and the at least partial application that is executable in the secure runtime environment at the application level.

7. The microprocessor system as claimed in claim 6, wherein the application filter interface is configured to check accesses directed to the application with regard to relevance to security and, in the case where the access is identified as relevant to security, to convey the access to the at least partial application in the secure runtime environment and, in the case where the access is identified as not relevant to security, to convey the access to the at least partial application in the insecure runtime environment.

8. The microprocessor system as claimed in claim 1, wherein the filter interface is coupled to a user output device in such a way that on the occasion of any access effected via the filter interface from the insecure runtime environment to the secure runtime environment or from the secure runtime environment to the insecure runtime environment, a user message perceptible to a user of the microprocessor system is output by the user output device.

9. The microprocessor system as claimed in claim 8, wherein the filter interface is coupled to the user output device in such a way that for accesses from the insecure runtime environment to the secure runtime environment and from the secure runtime environment to the insecure runtime environment different user outputs, distinguishable to the user, are output.

\* \* \* \* \*